(12) United States Patent
Gold et al.

(10) Patent No.: US 8,010,757 B2
(45) Date of Patent: Aug. 30, 2011

(54) MEDIA VAULTING

(75) Inventors: Stephen Gold, Fort Collins, CO (US); Robert Gilbson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2454 days.

(21) Appl. No.: 10/684,013

(22) Filed: Oct. 10, 2003

(65) Prior Publication Data

US 2005/0081007 A1 Apr. 14, 2005

(51) Int. Cl.
*G06F 12/14* (2006.01)
*G06F 12/16* (2006.01)

(52) U.S. Cl. .......................... 711/162; 711/161

(58) Field of Classification Search .................. None
See application file for complete search history.

(56) References Cited

U.S. PATENT DOCUMENTS

| | | | |
|---|---|---|---|
| 5,416,914 A | 5/1995 | Korngiebel et al. | |
| 5,506,986 A | 4/1996 | Healy | |
| 6,154,187 A * | 11/2000 | Kim | 345/60 |
| 6,154,817 A | 11/2000 | Mohan et al. | |
| 6,631,442 B1 * | 10/2003 | Blumenau | 711/112 |
| 6,810,462 B2 * | 10/2004 | Matsunami et al. | 711/112 |
| 2002/0152181 A1 * | 10/2002 | Kanai et al. | 705/80 |
| 2004/0044862 A1 * | 3/2004 | Carlson et al. | 711/161 |
| 2005/0021524 A1 * | 1/2005 | Oliver | 707/100 |

OTHER PUBLICATIONS

Tanenbaum, A.S. Structured Computer Organization. 1984. Prentice-Hall Inc.*
Vertices, "Vault Management", B&L Associates, Inc., Copyright 1998-2002, 5 pages; http://www.vertices.net/products/features_vault.htm.
"Media and Device Management Solutions", Legato Systems, Inc., 6 pages, http://www.legato.com/products/alphastor.
"Lagato Alphastor", Legato Systems, Inc., Copyright 2003, 5 pages, http://portal2.legato.com/products/alphastor/?mode =details.

* cited by examiner

*Primary Examiner* — Sanjiv Shah
*Assistant Examiner* — Samuel Dillon (57) ABSTRACT

A method is disclosed that comprises creating a plurality of vaulting policies, each vaulting policy having one or more cycles specifying a movement of media to a destination location and a time to execute the cycle. The method further comprises associating a first vaulting policy of the plurality to a first set of media and associating a second vaulting policy of the plurality to a second set of media, the second set of media comprising a subset of the first set of media, the second vaulting policy superseding the first vaulting policy for the media contained in the subset.

22 Claims, 8 Drawing Sheets

| Job ID | Start Time | Destination Site | Due Time |
|---|---|---|---|
| 100 | 12/5/2003 8:00 | Site 2 Bld A | 12/6/2003 8:00 |
| 450 | 12/5/2003 12:00 | Site 2 Bld B | 12/7/2003 12:00 |
| 800 | 12/6/2003 18:00 | Site 3 | 12/12/2003 17:00 |
| 1200 | 12/7/2003 8:00 | Site 4 | 12/14/2003 12:00 |
| 1245 | 12/7/2003 10:00 | Site 2 Bld C | 12/8/2003 17:00 |
| 1280 | 12/7/2003 15:00 | Site 2 Bld C | 12/9/2003 10:00 |
| 2090 | 12/8/2003 6:00 | Site 3 | 12/14/2003 10:00 |
| 2100 | 12/8/2003 18:00 | Site 2 Bld A | 12/10/2003 9:30 |
| 2150 | 12/9/2003 12:00 | Site 2 Bld B | 12/10/2003 17:00 |
| 2180 | 12/9/2003 20:00 | Site 1 | 12/10/2003 10:00 |
| 2750 | 12/10/2003 7:30 | Site 2 Bld A | 12/12/2003 9:30 |
| 2800 | 12/11/2003 6:15 | Site 3 | 12/18/2003 12:00 |
| 2910 | 12/12/2003 11:00 | Site 2 Bld C | 12/14/2003 17:00 |
| 2945 | 12/13/2003 10:00 | Site 4 | 12/27/2003 10:00 |

| MEDIA | DEVICE | LOCATION |
|---|---|---|
| ABC001 | DEVICE_A | BLD09 Z-1 |
| ABC002 | DEVICE_A | BLD09 Z-1 |
| DEF006 | DEVICE_B | BLD09 Z-3 |
| ABC004 | DEVICE_B | BLD09 Z-3 |
| DEF001 | DEVICE_B | BLD09 Z-3 |
| ABC006 | DEVICE_D | BLD10 X-1 |
| DEF009 | DEVICE_D | BLD10 X-2 |
| ABC008 | DEVICE_D | BLD10 X-2 |
| DEF007 | DEVICE_D | BLD10 X-2 |
| ABC007 | DEVICE_C | BLD10 X-3 |
| ABC003 | DEVICE_C | BLD10 X-3 |
| GHI090 | DEVICE_C | BLD10 X-3 |
| DEF010 | DEVICE_C | BLD10 X-3 |
| DEF989 | DEVICE_C | BLD10 X-3 |

MEDIA VAULTING

BACKGROUND OF THE INVENTION

The protection of data has become a high priority item for most businesses. In the event of a disaster, companies must be able to access data in a timely fashion or business may grind to a halt. Additionally, companies must safeguard their data in order to comply with regulations relating to the protection of customer data. Thus, companies are making sizeable investments on data protection and data protection strategies.

A great deal of consideration is given as to what data to protect, where to store protected data, and how long data should be protected. Media containing protected data may be stored in backup devices, onsite vaults, or offsite. Administrators may need to manually keep track of where the media is stored. Alternately, media vaulting management software may be used to track limited movement of media.

Currently, vaulting management software only allows very basic vaulting policies to be set up. These policies are typically not able to fulfill the requirements for complex media vaulting schemes with multiple media movements. Additionally, the current software also does not provide the ability for an administrator to confirm that media reached the intended destination.

Another problem is the notification of offsite vendors of shipments of media. Administrators must manually notify offsite vendors of incoming media and manually request offsite vendors to send media back when the data contained on the media no longer needs to be protected. Some offsite vendors have proprietary interfaces to allow the administrator to electronically notify the vendor of incoming media or request media. However, the administrator must manually send the electronic notification and must manually incorporate the information on incoming media into the media vaulting software. Overall, the management of media vaulting may be a very time-intensive and manual process.

SUMMARY OF THE INVENTION

In one embodiment, a plurality of vaulting policies are created. Each vaulting policy has one or more cycles that specify a movement of media to a destination location and a time to execute the cycle. A first vaulting policy is associated with a first set of media and a second vaulting policy is associated with a second set of media that includes a subset of the first set of media. The second vaulting policy supersedes the first vaulting policy for the media contained in the subset.

BRIEF DESCRIPTION OF THE DRAWINGS

Illustrative embodiments in accordance with the invention are illustrated in the drawings in which.

DETAILED DESCRIPTION

Figure 1:
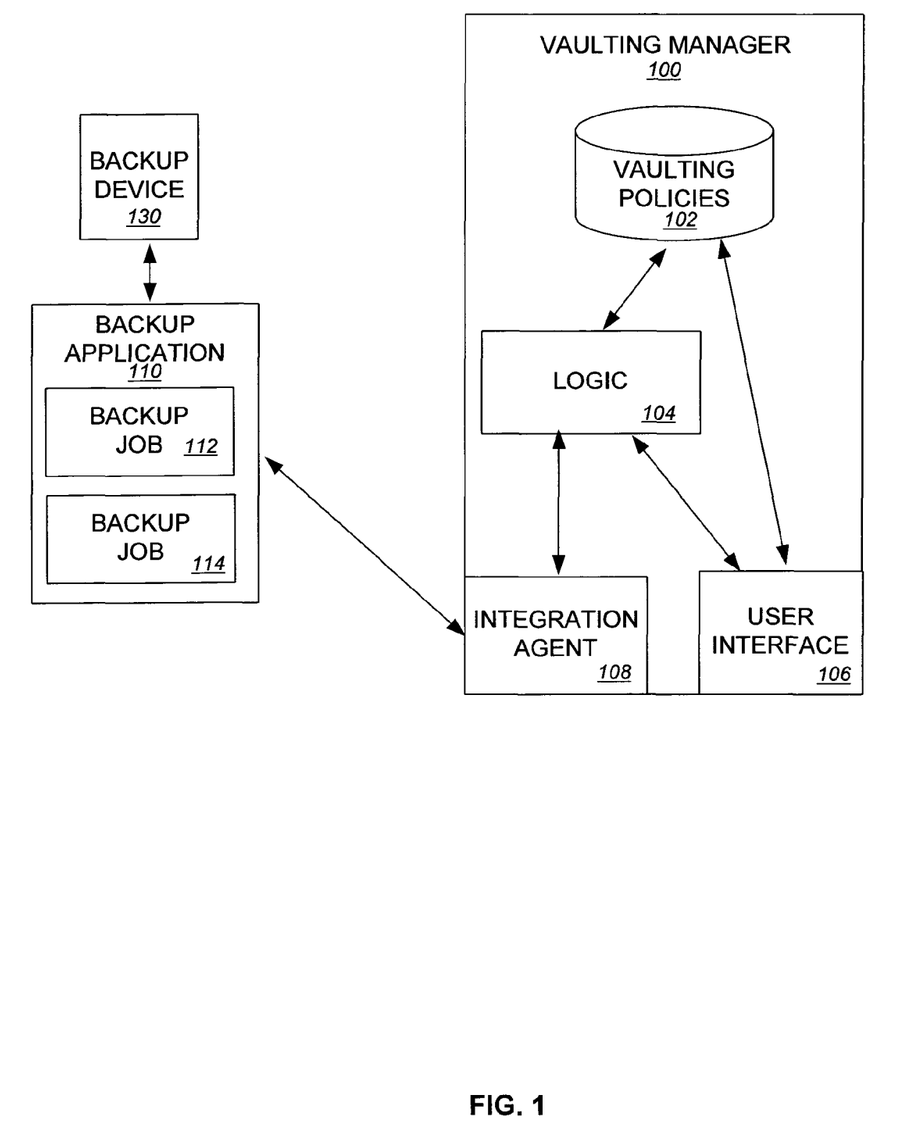
FIG. 1 illustrates an exemplary configuration of a vaulting manager to manage media vaulting.

An exemplary configuration using a vaulting manager 100 to manage media vaulting is illustrated in FIG. 1. It should be understood that that the term media should not be regarded as being limited to two or more pieces of media, but could also include a single medium. The vaulting manager 100 includes a plurality of vaulting policies 102. Each vaulting policy 102 may include one or more cycles specifying a movement of media to a destination location and a time to execute the cycle. Vaulting policies 102 and vaulting cycles will be described in further detail below.

In one embodiment, a portion of the media to be managed by vaulting manager 100 may be media containing data written by a backup application 110. Backup application 110 is responsible for backup jobs 112, 114 and uses backup device 130 to backup and restore data. By way of example, backup device 130 may be tape libraries, optical tape libraries, standalone tape drives, or other types of backup devices. The backup jobs 112, 114 may each be full or incremental backups of data contained in various locations, such as on a backup server executing the backup application 110, one or more clients communicatively coupled to the backup server, or other location (e.g., disk device) storing data to be backed up. In alternate embodiments, backup application 110 may be responsible for a different number of backup jobs than that illustrated in FIG. 1 and may use a different number of backup devices to store and retrieve data.

After data has been written to backup application 110, at least a portion of the media are protected and vaulted according to one or more vaulting policies 102. Vaulting manager 100 may include an integration agent 108 to receive backup job information for the backup jobs 112, 114 from backup applications 110. By way of example, integration agent 108 may receive backup job information from backup application 110 via a communicative coupling (e.g., internet or intranet) between the backup application 110 and the vaulting manager 100 using an open communication, such as XML (Extensible Markup Language). Vaulting manager 100 may manage media vaulting for media containing data written by more than one backup application and thus may be communicatively coupled to additional backup applications.

The backup job information may include devices and/or media pools used by the backup jobs, types of the backup jobs (e.g., full or incremental), locations of the data or systems being backed up by the backup jobs, media used by a backup job, start and/or completion time of the backup job, and any other information that may be used by vaulting manager 100 to manage media vaulting. The vaulting manager 100 may use the time the data was written as a relative time period to execute the one or more cycles of a vaulting policy 102 associated with the media. In alternate embodiments, vaulting manager 100 may obtain information needed to manage the vaulting of media from a source other than backup application 110 and thus may not be communicatively coupled to any backup applications and may not include integration agent 108.

In addition to vaulting policies 102, vaulting manager 100 may also include or have access to information (not shown) on media pools, backup jobs, systems backed up, individual media, current location of media, and/or other types of information that may be used to manage media vaulting. Some of this information may have initially been obtained from backup application 110 or may have been obtained from an alternate source, such as from a user or other application. This information may facilitate the management of media vaulting in embodiments in which vaulting manager 100 is additionally or alternately responsible for managing media that has been previously vaulted or has been written by applications to which vaulting manager is not communicatively coupled. As will be described in further detail below, the information may also be used to create media movement jobs based on the vaulting policies 102.

In some embodiments, vaulting manager 100 may also include logic 104, communicatively coupled to the vaulting policies 102 and an integration agent 108. Logic 104 may receive the backup job information from integration agent 108 and use this information, along with the vaulting policies 102, to create a media movement job. As will be described in further detail below, the media movement job may include a destination for a set of media and a time period to perform the media movement. Logic 104 may also determine which vaulting policy 102 to apply to a medium based on a set membership of the medium.

Vaulting manager 100 may additionally include a user interface 106 communicatively coupled to logic 104 and/or vaulting policies 102. User interface 106 may be used to receive and convey information to a user (e.g., an administrator or operator). By way of example, the user interface 106 may be used to configure (add, edit, and delete) the vaulting policies 102 and to associate each of the vaulting policies 102 to a set of media. As will be described in further detail below, user interface 106 may also be used to receive confirmation verifying completion of media movement.

Configurations different than the one shown in FIG. 1 may be used in alternate embodiments. For example, integration agent 108 may additionally or alternately reside on one or more of the servers executing the backup application 110. This configuration may facilitate the exchange of information in configurations containing firewalls. Additionally, vaulting manager 100 may be a component of backup application 110.

Vaulting manager 100, logic 104, user interface 106, and integration agent 108 may be implemented in software, firmware, hardware, or a combination of these. Additionally, these components may reside on separate physical locations, such as separate servers. By way of example, in one embodiment, the user interface 106 may be a web browser on a remote client.

Figure 2:
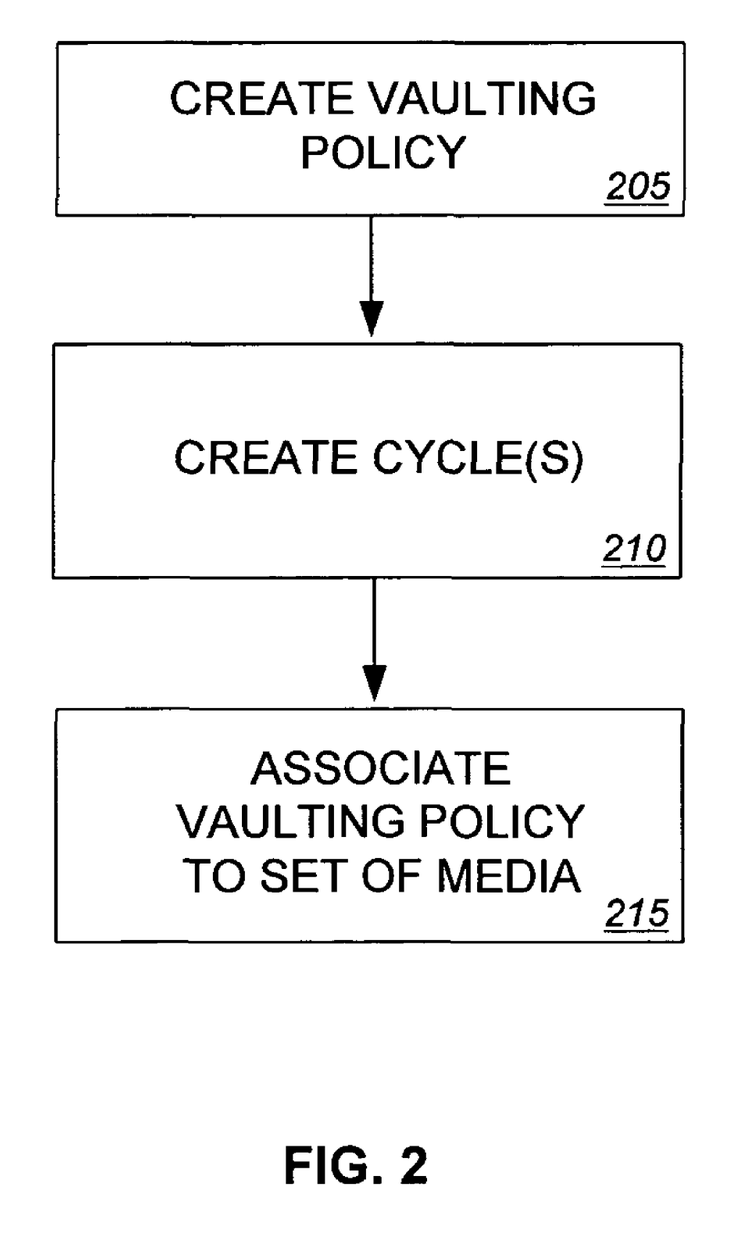
FIG. 2 is a flow diagram illustrating an exemplary method for managing media vaulting that may be used by the vaulting manager of FIG. 1.

FIG. 2 illustrates an exemplary method of managing media vaulting that may be used by vaulting manager 100. A plurality of vaulting policies 102 are created 205. By way of example, the vaulting policies 102 may be created by a user using user interface 106. Each vaulting policy 102 may include a policy name and a time period to protect data associated with the vaulting policy 102. In one embodiment, after the time period has expired, the media storing the protected data may be destroyed or recycled as scratch media. In another embodiment, the media may not be destroyed or recycled until both the time period has expired and the backup application using the media reports that the media is no longer protected. In alternate embodiments, the vaulting policy may not include a time period and the media may be destroyed or recycled when the backup application using the media reports that the media is no longer protected.

For each vaulting policy 102, one or more cycles are also created 210. Each cycle specifies a movement of media to a destination location and a time to execute the cycle. Destination locations may include a destination site and may be specific locations within that site or may be a general location type (e.g., backup device, onsite vault, or offsite vault). The time to execute the cycle may be a relative time (e.g., number of days or hours) after data is written to a media. By way of example, media associated with a cycle having a relative time of 0 days may be executed the day data is written to the media. In alternate embodiments, absolute times or times relative to one or more previous movements of the media may also be used.

Figure 3:
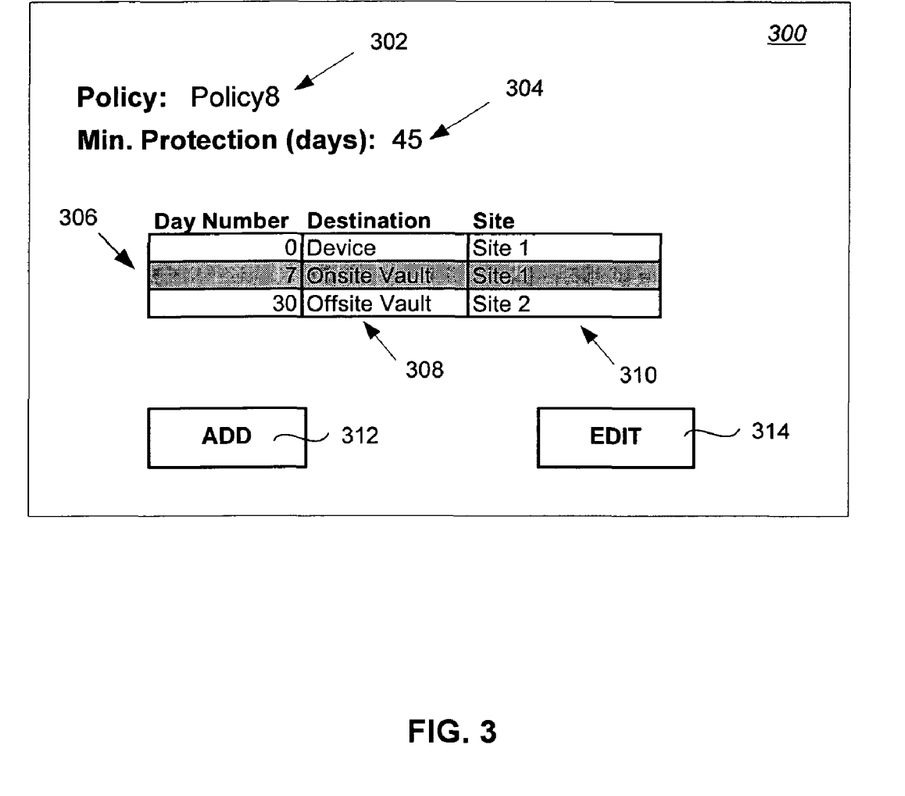
FIG. 3 illustrates an exemplary screen to configure vaulting policies that may be presented by the vaulting manager of FIG. 1.

FIG. 3 illustrates an exemplary screen 300 that may be presented by user interface 106 to create vaulting cycles 210 for a vaulting policy 102. A display area 302 may be included to display the vaulting policy 102 for which the cycles are being created. The screen 300 may also include a second display area 304 to display the minimum protection time frame for data associated with the vaulting policy 102. In alternate embodiments, screen 300 may not include display areas 302, 304 or may alternately include entry areas for the user to create the vaulting policy 102 using screen 300 instead of a separate screen.

Screen 300 further includes a column 306 for displaying a time to execute the cycle. As previously described, in one embodiment, the time may be a relative number of hours or days after data has been written to media. A second column 308 displays the destination for a movement of media associated with the vaulting policy 102 and a third column 310 displays the site location of the destination. A button 312 may be provided to add a new cycle and a second button 314 may be provided to edit existing cycles. Alternately, columns 306, 308, 310 may be edited and/or added to in-place.

The policy illustrated in FIG. 3 is configured to move media on the day it is written to device located at Site 1. Some media may already be located in device. Seven days afterwards, a second cycle specifies the media should be moved to an onsite vault also located at Site 1. Thirty days after the media is written, it is moved to an offsite vault located at Site 2. In some embodiments, an automatic media movement may occur forty-five days after the media is written, returning the media to a backup device and recycling the media as scratch media.

Returning to FIG. 2, after media policies and cycles are created 205, 210, some or all of the vaulting policies 102 may each be associated 215 to one or more sets of media. A set of media may contain one or more media. By way of example, sets of media may be media contained in a media pool, media used for a specified backup job, media used to backup a specified system, and an individual medium. In one embodiment, vaulting policies 102 may be hierarchical. With hierarchical vaulting policies 102, a first set of media may be associated to a first vaulting policy and a second set of media that includes a subset of the first set of media may be associated to a second vaulting policy. For media contained in the subset, the second vaulting policy supersedes the first vaulting policy.

In one embodiment, a hierarchical order may be: 1) media pool; 2) backup job; 3) system from which data originated; and 4) individual medium. In this hierarchy, a policy applied to a lower order in the hierarchy supersedes policies applied in a higher order. For example, if a first vaulting policy is applied to media in a first media pool and a second vaulting policy is applied to media used by a first backup job, the second vaulting policy supersedes the first vaulting policy for media that is in the first media pool and was used by the first backup job. Hierarchies other than the illustrated hierarchy may also be used.

In some embodiments, media movement jobs may be created by logic 104 based on cycles specified in the vaulting policies 102. Each media movement job may include a destination for a subset of media and a time period to perform the media movement. By way of example, the time period may include a start time to start the media movement job and a due time to complete the media movement job. The start time may be determined based on a user parameter specifying days or times to execute a vaulting cycle and the due time may be calculated based on parameters specifying estimated completion times for moving media from one location to another location. As media movement jobs may only be created at periodic times, media movements for some cycles may be delayed (i.e., may be created later than the execution time specified in the cycle).

Media movement jobs may be created for subsets of media located in a single source location. Alternately, media movement jobs may be created for multiple source locations having a single destination. In some embodiments, the specific location within a destination (e.g., specific vault, or device) may be determined by logic 104 based on free spaces in the specific location. In some embodiments, a single media movement job may be based on one or more than one vaulting policy 102.

Figure 4:
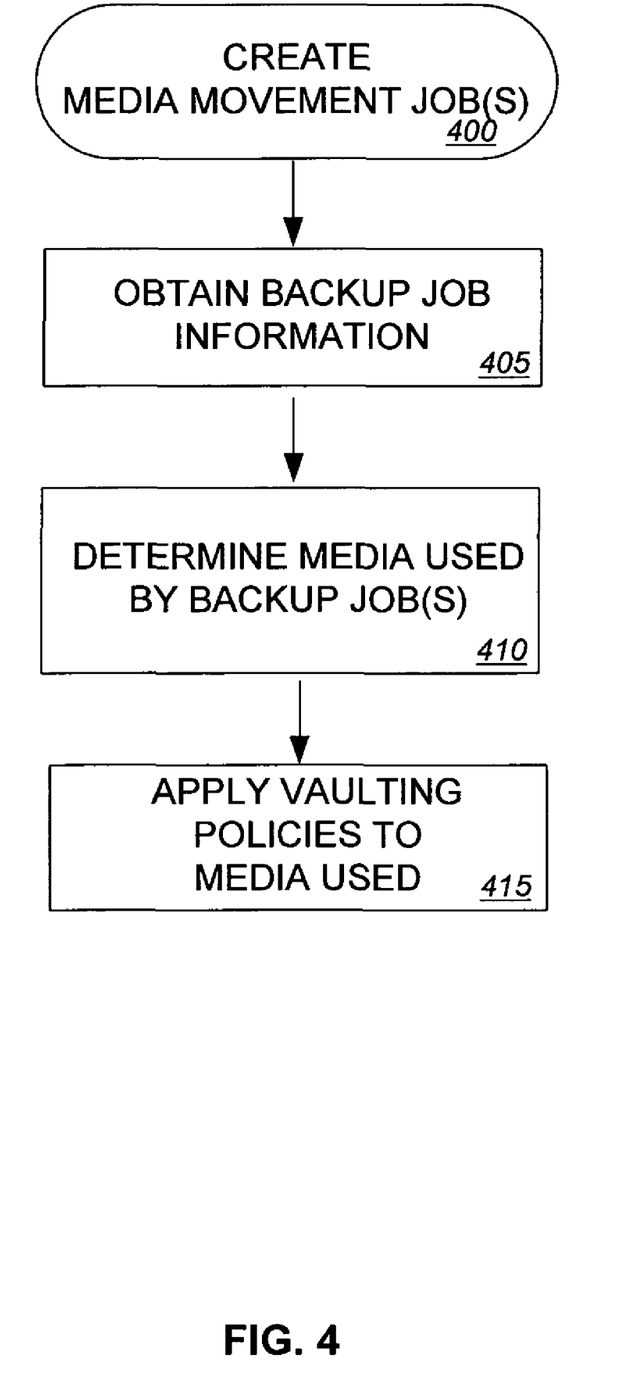
FIG. 4 is a flow diagram illustrating an exemplary method for creating media movement jobs that may be used by the vaulting manager of FIG. 1.

FIG. 4 illustrates an exemplary method that may be used to create 400 one or more media movement jobs. Backup job information may be obtained 405 from a backup application 110 for one or more backup jobs 112, 114. As previously described, backup job information may include devices and/or media pools used by the backup jobs, types of the backup jobs (e.g., full or incremental), locations of the data or systems being backed up by the backup jobs, media used by a backup job, start and/or completion time of the backup job, and any other information that may be used by vaulting manager 100 to manage media vaulting. Media movement jobs may be created for all cycles of a vaulting policy 102 at the time the backup job information is obtained. Alternately, vaulting manager 100 may store some or all of the backup job information (e.g., date the media was written) to create future media movements specified by vaulting cycles. In alternate embodiments, information needed for the creation of media movement jobs may be obtained in an alternate fashion than that described Next, logic 104 may use the backup job information to determine 410 the media used by the backup jobs 112, 114. Any media that has been written may need to be moved, or may start a time period running for a media movement job, according to a cycle specified in a vaulting policy 102. Thus, one or more vaulting policies 102 may be applied 415 to the media used by backup jobs 112, 114. By way of example, a media movement job may be created for the second cycle of Policy8 302 with a destination of Onsite Vault in Site 1 with a start time of seven days after the media associated with Policy8 has been used.

In addition to the creation of media movement jobs specified by cycles of vaulting policies 102, logic 104 may also create media movement jobs for media containing data that has exceeded the protection date. As protection for this data is no longer required, the media may be recycled and used as scratch media for subsequent executions of backup jobs 112, 114. Accordingly, media movement jobs may be created to return the media to a backup device 130 or a site containing backup devices.

In some embodiments, logic 104 may use additional constraints in the creation of media movement jobs. By way of example, one or more vaulting policies 102 may specify that a lockable container must be used when sending media to an offsite vendor. Therefore, a media movement job may first be created moving media to a lockable container and then subsequent jobs may be created for the shipment of the container to the offsite vendor.

In some embodiments, vaulting manager 100 may be communicatively coupled to other vaulting managers. In these embodiments, vaulting manager 100 may remotely initiate media movement jobs on vaulting managers in different source and destination locations. After a media movement job has been created 400, vaulting manager 100 may automatically create one or more media movement jobs on vaulting managers located at one or more source locations of the media for the parent media movement job created at 400. This media movement job notifies operators at the source site to locate the media and ship it. Similarly, vaulting manager 100 may also automatically create a media movement job at the vaulting manager located at the destination location for the parent media movement job, which may provide notification to the destination of the incoming media. To prevent the inclusion of media that was not shipped to the destination (e.g., because the media is missing), vaulting manager 100 may wait to create the media movement job for the destination site until after the source site has completed its media movement job.

In addition to or instead of the coupling to other vaulting managers, vaulting manager 100 may also include an electronic interface (e.g., FTP) to one or more software applications used by third parties, such as offsite vendors. Vaulting manager 100 may use the electronic interface to automatically notify the third party of incoming media or request that media be returned. This automatic notification may be done by creating media movement jobs at the source and/or destination locations in a manner similar to that described above. Alternately, the electronic notification may be sent in accordance with requirements of the third party software.

Figure 5:
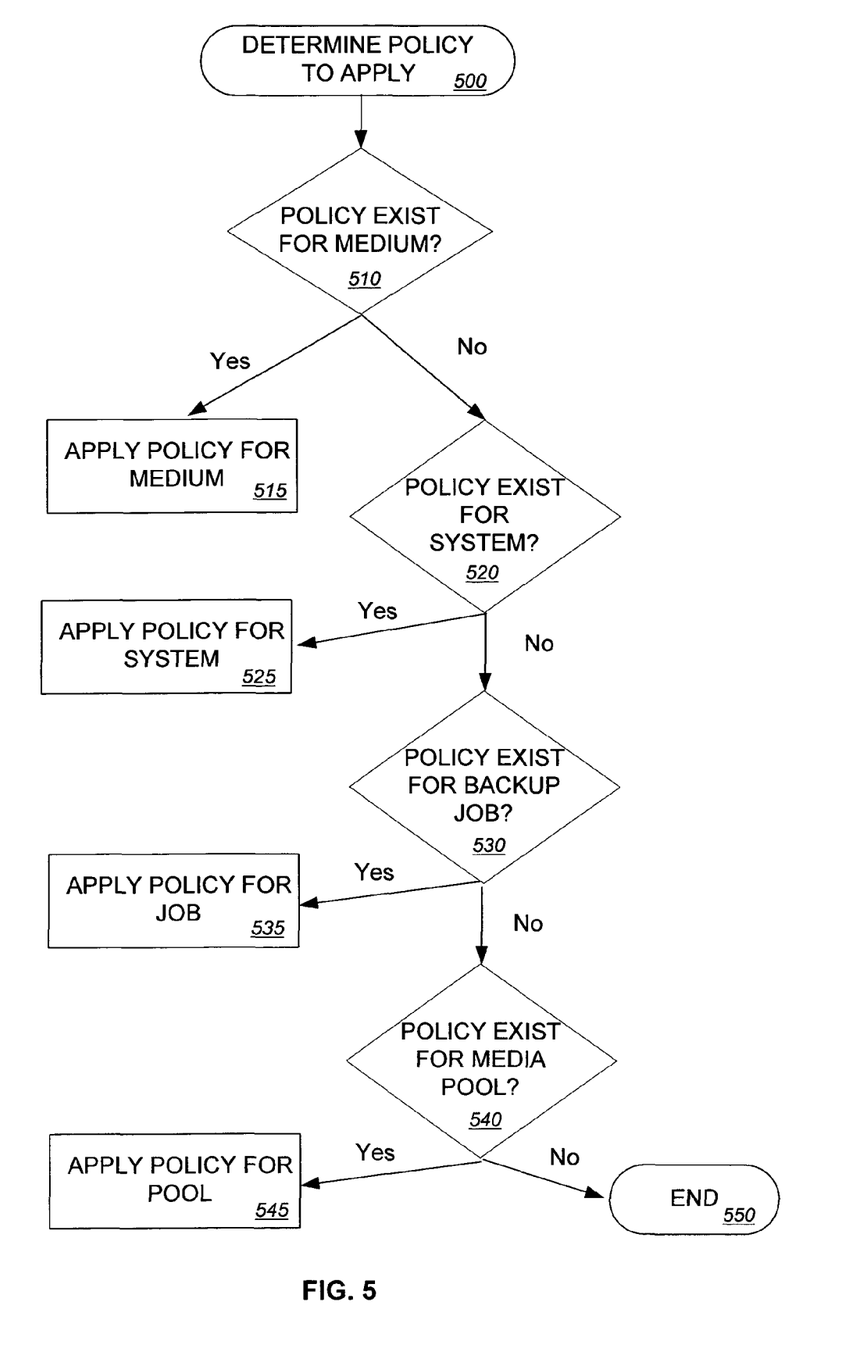
FIG. 5 is a flow diagram illustrating an exemplary method for determining a vaulting policy to apply.

In some embodiments, vaulting policies 102 may be hierarchical, wherein a specific vaulting policy for a subset of media may supersede a vaulting policy for a larger set. FIG. 5 illustrates an exemplary method that may be used to determine 500 which vaulting policy 102 to apply to a medium that has been used 410 by a backup job 112, 114 in a hierarchical scheme.

First, a determination is made as to whether a vaulting policy 102 exists 510 for the medium (i.e., a vaulting policy 102 has been associated to the medium). If a vaulting policy 102 exists for the medium, the vaulting policy 102 associated with the medium is applied 515. Otherwise, a determination is made as to whether a vaulting policy 102 exists 520 for the system the medium was used to back up. If such a vaulting policy exists 420, the vaulting policy 102 associated with the system is applied 525.

If a vaulting policy 102 for the system does not exist, but a vaulting policy 102 exists 530 for the backup job 112, 114 that used the medium, that policy is applied 535. Otherwise, if a vaulting policy 102 exists 540 for the media pool containing the medium, the vaulting policy 102 associated with the media pool is applied 545. If there are no vaulting policies 102 associated with the medium, system, backup job, and media pool, the method ends 550. Alternately, a default vaulting policy 102 may be applied.

Figure 6:
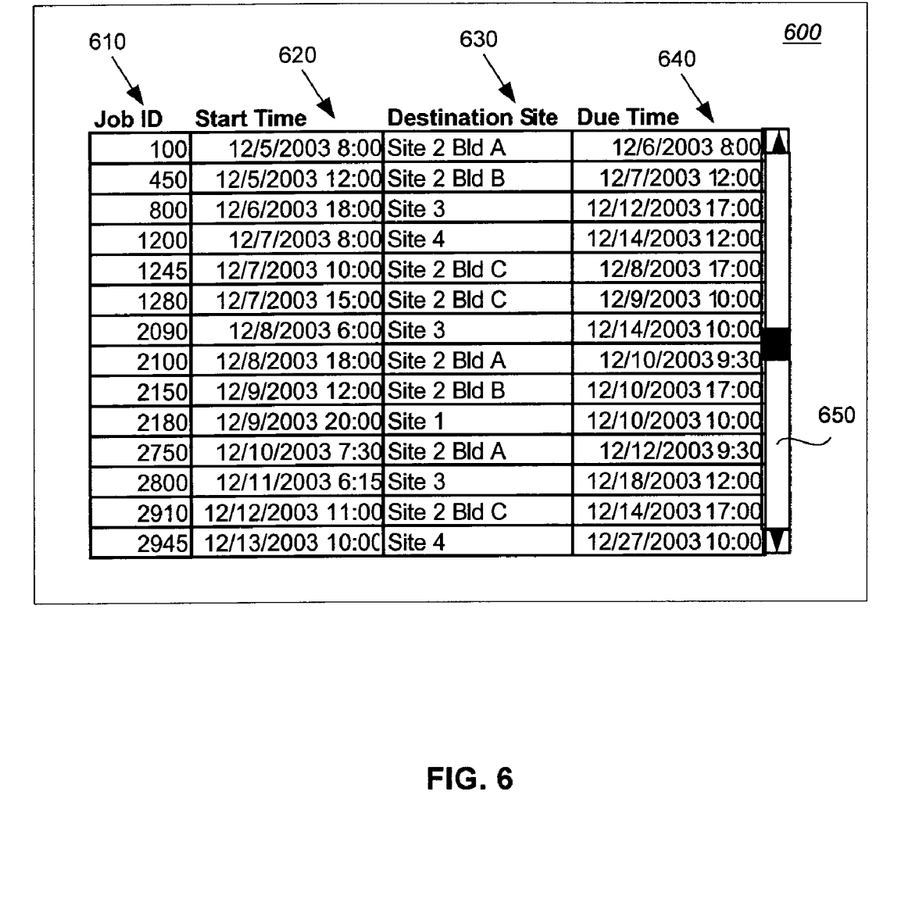
FIG. 6 illustrates an exemplary presentation to a user of multiple media movement jobs.

FIG. 6 illustrates an exemplary screen 600 that may be presented by user interface 106 listing media movement jobs to be performed. The media movement jobs may be listed for a particular site or may include all media movement jobs initiated by vaulting manger 100. A first column 610 may be provided to list a job identification number.

The start time for the media movement job may be listed in a second column 620. A third column may also be provided to list the destination 630. In some embodiments, media movement jobs may be created for specific locations within a site. In those embodiments, the destination may be a combination of destination site and specific location within the device. Alternately, an additional column may be provided to list the specific location within a site for the media movement job.

The screen further includes a fourth column 640 specifying the due time for completion of the media movement. The due time may have been calculated by logic 104 based on parameters estimating times to move media between locations and the current location of the media. A scroll bar 650 may also be provided on screen 600, as the list of media movement jobs may be lengthy.

Figure 7:
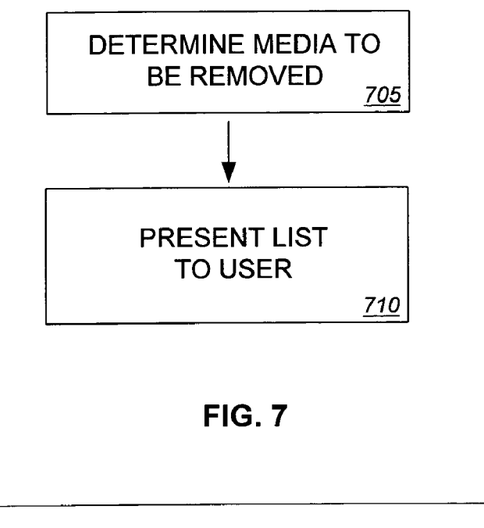
FIG. 7 is a flow diagram illustrating an exemplary method for determining media to be removed from one or more backup devices for a media movement job.

As illustrated by FIG. 7, in some embodiments, logic 104 may additionally determine 705 a list of media to be removed from one or more backup devices 130 to perform a media movement job. The list may then be presented 710 to a user (e.g., media operator). In addition, or in the alternative, the media to be removed may be automatically unloaded by sending a request to a backup application 110 to unload the media or sending a request directly to the backup device 130 or other software managing the backup device 130.

Figure 8:
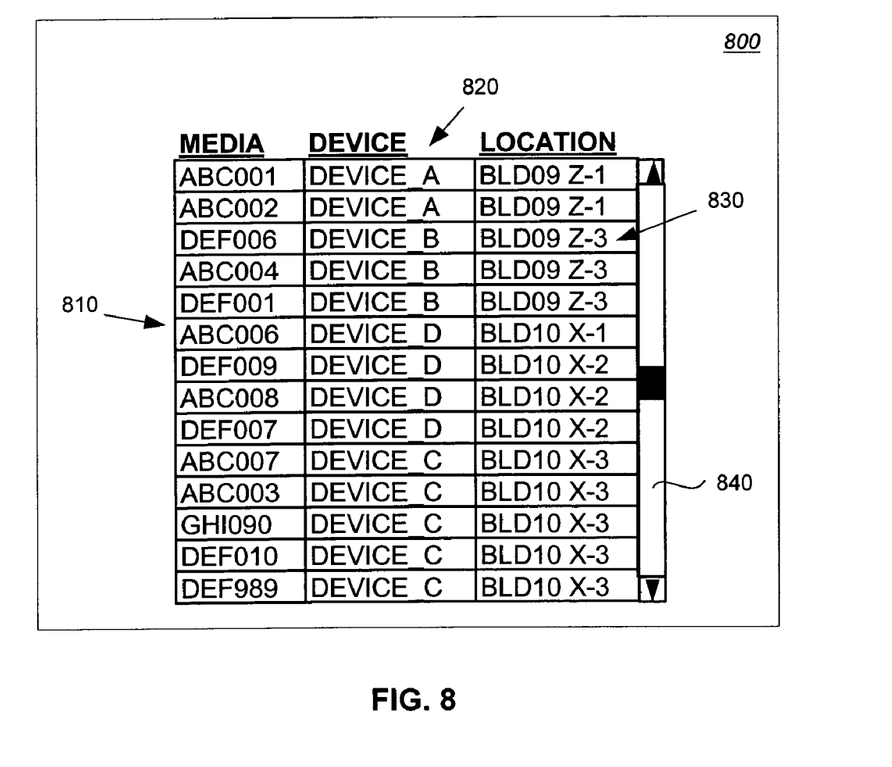
FIG. 8 illustrates an exemplary presentation to a user of media to unload.

FIG. 8 illustrates an exemplary presentation to a user, which may be provided by user interface 106, of a list of media to be removed. As shown in the screen 800, the list may include a column 810 for the media to be removed. A second column 820 is also provided listing the device containing the media and a third column 830 may be provided specifying the location of the device. Scroll bar 840 may also be provided to facilitate the viewing of the list.

The location may be a data center within a site and may also include a grid location of the device. In one embodiment, the list may be ordered based on the location of the device. For example, the first device an operator unloads is listed first and the remaining devices are listed in order based on the physical proximity of the devices to the first device. The information needed to order the list may be obtained from a user via user interface 106 or may be retrieved from another location.

Figure 9:
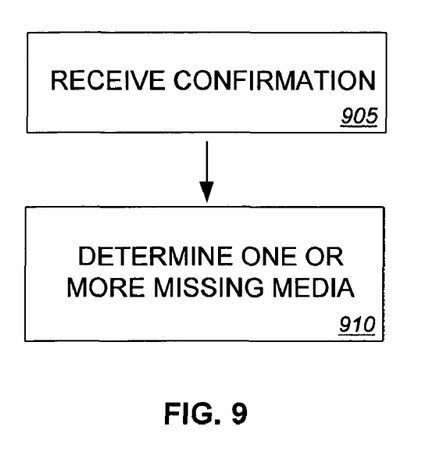
FIG. 9 is a flow diagram illustrating an exemplary method for confirming completion of a media movement job.
Figure 10:
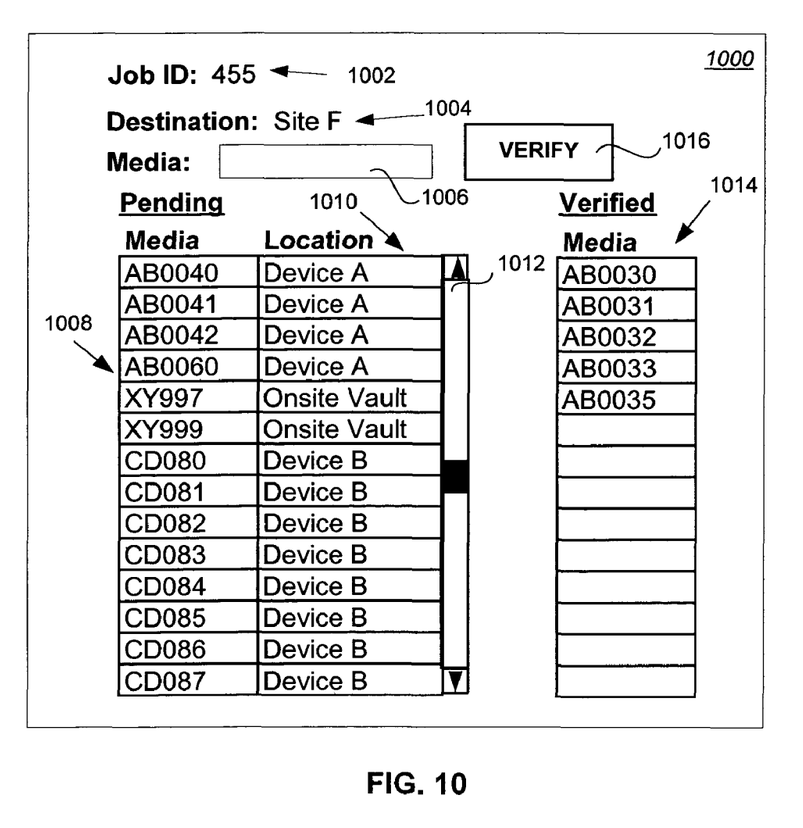
FIG. 10 illustrates an exemplary user interface that may be used to verify completion of media movement for one or more media.

FIG. 9 illustrates an exemplary method that may be used to confirm completion of a media movement job for one or more media. After a media movement job is created 400, confirmation may be received 905 from a user verifying completion of the media movement job for one or more media. FIG. 10 illustrates an exemplary screen 1000 that may be provided by user interface 106 for the user to verify completion of a media movement job.

Display areas 1002, 1004 may be provided to list the job ID and the destination for the media movement job. Screen 1000 further includes a text entry area 1006 to enter the media which have reached the destination of the media movement job. The user interface 106 may receive this information, for example, from a keyboard or a barcode scanner used to scan barcodes located on the media. A verify button 1016 may be provided to verify that the media movement job has been completed for each piece of media entered in text entry area 1006. Alternately, the verify button 1016 may verify multiple pieces of time.

Screen 1000 may also include a first column 1008 to list the pending media for the media movement job and a second column 1010 listing the location of the media. Scroll bar 1012 may be used to scroll the list of pending media. A third column 1014 may list the media which have been verified. In alternate embodiments, buttons may be provided to move media from the pending media list to the verified media list.

Returning to FIG. 9, after receiving 905 confirmation verifying completion of the media movement job for one or more media, logic 104 may determine 910 one or more missing media that did not complete the media movement. The missing media may be reported to a user (e.g., using user interface 106). Additional information, such as the last known location of the media and/or the user last verifying completion of a previous media movement job may also be provided. In alternate embodiments, 910 may not be performed.

It should be appreciated that the methods described above may be performed by hardware components or may be embodied in sequences of machine-executable instructions, which may be used to cause a machine, such as a general-purpose or special-purpose processor or logic circuits programmed with the instructions to perform the actions set forth in FIGS. 2, 4, 5, 7, and 9. Alternatively, the methods may be performed by a combination of hardware and software. It should also be appreciated that the methods may be performed in an order different than that described above. Further, steps or sequences may be added or removed without departing from the scope and spirit of embodiments in accordance with the invention.

What is claimed is:

1. A method comprising:
   creating a plurality of vaulting policies, each vaulting policy having one or more cycles specifying a movement of media to a destination location and a time to execute the cycle;
   associating a first vaulting policy of the plurality to a first set of media;
   associating a second vaulting policy of the plurality to a second set of media, the second set of media comprising a subset of the first set of media, the second vaulting policy superseding the first vaulting policy for the media contained in the subset; and
   vaulting at least portions of said first and second sets of media according to said plurality of vaulting policies.

2. The method of claim 1, further comprising creating a media movement job based on at least the first vaulting policy, the media movement job comprising a destination for a second subset of media in the set and a time period to perform the media movement.

3. The method of claim 2, wherein creating a media movement job comprises:
   obtaining backup job information from a backup application for one or more backup jobs; and
   determining at least a portion of the second subset of media by determining media used by the one or more backup jobs.

4. The method of claim 2, further comprising receiving a confirmation verifying completion of the media movement job for one or more media of the second subset.

5. The method of claim 4, further comprising determining one or more missing media based on the confirmation.

6. The method of claim 2, wherein the time period comprises a start time to start the media movement job and a due time to complete the media movement job.

7. The method of claim 2, further comprising creating a second media movement job based on the media movement job, the second media movement job created on a vaulting manager at a source location of at least a portion of the second subset of media.

8. The method of claim 2, further comprising creating a second media movement job based on the media movement job, the second media movement job created on a vaulting manager at the destination for the second subset of media.

9. The method of claim 1, wherein the time for each of the one or more cycles comprises relative number of days after data is written to a medium.

10. The method of claim 1, wherein creating a plurality of vaulting policies comprises for each vaulting policy, setting a time period for protecting data.

11. The method of claim 1, wherein each of the destination locations for the one or more cycles comprises one of a backup device, an onsite vault, and an offsite vault.

12. A method comprising:
receiving backup job information from a backup application for one or more backup jobs;
creating a media movement job for a set of media based on the backup job information and one or more vaulting policies, the media movement job comprising a destination for the set of media and a time period to perform the media movement; and
moving the set of media based on said media movement job.

13. The method of claim 12, wherein creating the media movement job comprises:
determining media used by the one or more backup jobs based on the backup job information; and
applying the one or more vaulting policies to at least a portion of the media used by the one or more backup jobs.

14. The method of claim 12, wherein the time period comprises a start time to start the media movement job and a due time to complete the media movement job.

15. The method of claim 12, further comprising:
determining media to be removed from a backup device associated with the backup application based on the media movement job; and
presenting to a user a list of the media to be removed from the backup device.

16. A system comprising:
a plurality of vaulting policies, each vaulting policy having one or more cycles specifying a movement of media to a destination location and a time to execute the cycle;
a user interface to configure the plurality of vaulting policies and to associate each of the vaulting policies to a set of media; and
logic, communicatively coupled to the vaulting policies, to determine a vaulting policy of the plurality of vaulting policies to apply to a medium based on a set membership of the medium, wherein a vaulting policy for a subset supersedes a vaulting policy for a set.

17. The system of claim 16, further comprising:
an integration agent to receive backup job information for a plurality of backup jobs from a backup application; and
wherein said logic is further to create a media movement job based on at least one of the plurality of vaulting policies and the backup job information, the media movement job comprising a destination for a first set of media and a time period to perform the media movement.

18. The system of claim 16, wherein said user interface is further configured to receive a confirmation for the media movement job specifying completion of the media movement job for one or more media in the first set.

19. The system of claim 16, further comprising vaulting information comprising a current location of one or more media.

20. At least one machine-readable medium having stored thereon sequences of instructions, which, when executed by a machine, cause the machine to perform the actions:
creating a plurality of vaulting polices, each vaulting policy having one or more cycles specifying a movement of media to a destination location and a time to execute the cycle;
associating a first vaulting policy of the plurality to a first set of media; and
associating a second vaulting policy of the plurality to a second set of media, the second set of media comprising a subset of the first set of media, the second vaulting policy superseding the first vaulting policy for the media contained in the subset.

21. The medium of claim 20, further comprising instructions, which when executed by the machine, cause the machine to perform the action of creating a media movement job based on at least the first vaulting policy, the media movement job including a destination for a second subset of media in the first set and a time period to perform the media movement.

22. The medium of claim 20, further comprising instructions, which when executed by the machine, cause the machine to perform the action of receiving a confirmation verifying completion of the media movement job for one or more media in the second subset.

* * * * *

UNITED STATES PATENT AND TRADEMARK OFFICE
CERTIFICATE OF CORRECTION

| | | |
|---|---|---|
| PATENT NO. | : 8,010,757 B2 | Page 1 of 1 |
| APPLICATION NO. | : 10/684013 | |
| DATED | : August 30, 2011 | |
| INVENTOR(S) | : Stephen Gold et al. | |

It is certified that error appears in the above-identified patent and that said Letters Patent is hereby corrected as shown below:

In column 9, line 6, in Claim 9, delete "comprises relative" and insert -- comprises a relative --, therefor.

Signed and Sealed this
Twenty-seventh Day of March, 2012

David J. Kappos
*Director of the United States Patent and Trademark Office*